(12) United States Patent
Ehrenleitner

(10) Patent No.: US 7,393,444 B2
(45) Date of Patent: Jul. 1, 2008

(54) INSTALLATION FOR TREATING, IN PARTICULAR FOR COATING, ARTICLES, ESPECIALLY VEHICLE BODIES

(75) Inventor: Franz Ehrenleitner, Altensteig (DE)

(73) Assignee: Eisenmann Analgenbau GmbH & Co. KG, Boeblingen (DE)

( * ) Notice: Subject to any disclaimer, the term of this patent is extended or adjusted under 35 U.S.C. 154(b) by 770 days.

(21) Appl. No.: 10/708,310

(22) Filed: Feb. 24, 2004

(65) Prior Publication Data

US 2005/0183662 A1 Aug. 25, 2005

(30) Foreign Application Priority Data

Feb. 24, 2003 (DE) .............................. 103 08 034

(51) Int. Cl.
*B65G 49/02* (2006.01)
(52) U.S. Cl. ................. 204/623; 118/423; 118/426
(58) Field of Classification Search ................. 204/623; 118/423, 426
See application file for complete search history.

(56) References Cited

U.S. PATENT DOCUMENTS 6,673,153 B2 * 1/2004 Ehrenleitner et al. ........ 118/423
6,676,755 B2 * 1/2004 Ehrenleitner et al. ........ 118/423

FOREIGN PATENT DOCUMENTS

DE 101 00 377 A1 1/2001
DE 201 05 676 U1 1/2001

* cited by examiner

*Primary Examiner*—Kishor Mayekar
(74) *Attorney, Agent, or Firm*—Factor & Lake, Ltd.

(57) ABSTRACT

An installation for treating articles, especially vehicle bodies, comprises at least one treatment zone, in particular a bath containing a treatment liquid, into which the articles are introduced. The articles are conveyed through the installation in a continuous or intermittent translational movement. To this end, the installation comprises at least two transport carriages combined to form a pair, which in turn each comprise a running gear and at least one swivel arm, which is connected to the respective running gear so as to be swivellable about a first pivot pin and with which a supporting structure for the article to be treated is connected so as to be swivellable about a second pivot pin. The unit includes the two transport carriages effecting a correlated movement actually has six degrees of freedom of motion, wherein drives are provided for at least three of these degrees of freedom of motion.

8 Claims, 11 Drawing Sheets

INSTALLATION FOR TREATING, IN PARTICULAR FOR COATING, ARTICLES, ESPECIALLY VEHICLE BODIES

SUMMARY OF INVENTION

The invention relates to an installation for treating, in particular coating, articles, especially vehicle bodies, having:

a) at least one treatment zone, in particular a bath containing a treatment liquid, into which the articles are introduced; and b) a conveying means, with which the articles may be conveyed through the installation in a continuous or intermittent translational movement and which comprises at least one transport carriage, which in turn comprises:

ba) a running gear; and bb) at least one swivel arm, which is connected with the running gear so as to be swivellable about a first pivot pin and with which a first point of a supporting structure for the article to be treated is connected so as to be swivellable about a second pivot pin.

Such an installation is known from DE 201 05 676 U. In this installation, each article or a plurality of articles is/are conveyed by a single transport carriage, which may be controlled in all its degrees of freedom of motion completely independently of any further transport carriages present in the same installations. With the assistance of the double-articulated connection, extending via the swivel arm, between the running gear and the article to be treated, and using the translational movement, the widest possible range of kinematics may be achieved for a feed and delivery movement of the article or articles. This installation operates outstandingly well and has exceptional flexibility. However, for large articles to be coated, in particular for bodies of smaller or larger heavy goods vehicles, expensive measures are required to overcome the problems involved in a single transport carriage accommodating the weight and in accommodating the torques which arise with the various pivot movements.

The object of the present invention is therefore to provide an installation of the above-mentioned type with which very large articles may be treated with comparable flexibility.

This object is achieved according to the invention in that:

c) a second transport carriage is assigned to each transport carriage, which likewise comprises:

ca) a running gear; and cb) at least one swivel arm, which is connected with the running gear so as to be swivellable about a first pivot pin and with which a first point of a supporting structure for the article to be treated is connected so as to be swivellable about a second pivot pin.

in such a way that:

d) the pair of two transport carriages comprises the following six degrees of freedom of motion:

translational movement of first transport carriage;

translational movement of second transport carriage;

swivelling of swivel arm of first transport carriage about first pivot pin thereof;

swivelling of swivel arm of second transport carriage about first pivot pin thereof;

swivelling of supporting structure about second pivot pin of first transport carriage;

swivelling of supporting structure about second pivot pin of second transport carriage;

wherein:

e) for at least three of the above-mentioned degrees of freedom of movement, drives are provided, at least one of which is a translational drive.

According to the invention, therefore, two transport carriages, whose construction corresponds substantially to that in the prior art, are coupled together in pairs. The pairs as units are likewise independent of the other pairs of transport carriages in the system, as was the case with the individual transport carriages constituting the subject matter of DE 201 05 676 U. This means in particular that the translational movements of the various pairs of transport carriages, like the motion kinematics with which the articles attached thereto are introduced into the treatment zone, may be controlled wholly independently of one another by individual control means of the individual transport carriages and/or the pairs of transport carriages and/or an installation control means. However, within the pairs of transport carriages, actuation takes place in correlation with the various degrees of freedom. At least three degrees of freedom have therefore to be controlled under the control of an active drive; the other degrees of freedom generally follow automatically on the basis of the mutual connections between the two transport carriages and the supporting structure.

Unfavorable geometric conditions and very particular angular positions of the swivel arms in the transport carriage pair may give rise to self-locking or render the movement sequence undefined, if drives are present for only three degrees of freedom of motion. It may therefore be advisable in individual cases to provide drives for four degrees of freedom of motion, wherein at least one drive is actuated by a control means which is compatible with the drives of the other degrees of freedom of motion. The latter requirement is a consequence of the fact that three drives actually fix the basic movement sequence within the pair of transport carriages and the fourth drive, which has to act only in the event of self-locking or if the movement sequence is undefined, must not counteract the kinematics preset by the other three drives.

In principle, both transport carriages of a pair may comprise a translational drive. These are then both actuated in such a way that a desired average speed of movement is established for both transport carriages of the pair, at the same time as a desired spacing between the two transport carriages.

Alternatively, a development of the invention is possible in which one transport carriage of a pair comprises a translational drive and a drive is provided with which the spacing between the two transport carriages of the pair may be varied. In this embodiment, the translational drive provided for the first transport carriage sets the "basic feed" of the pair, while, with the assistance of the second drive, the speed of movement of the second transport carriage relative to that of the first transport carriage of the pair is varied in such a way that the spacing is adjusted between the transport carriages, which is necessary in accordance with the desired kinematics.

The drive which changes the spacing may be a spindle drive.

From the point of view of control, it is particularly favorable for all the drives for all the degrees of freedom of motion to be arranged on one transport carriage of the pair. In this case, it is sufficient actively to actuate only this one transport carriage; electrical supply to the second transport carriage is unnecessary, at least for power elements.

However, it is of course also feasible to distribute the drives for the degrees of freedom of motion between the two transport carriages, depending on the circumstances.

Vehicle bodies are frequently coated by a electrophoretic dipping operation. If the installation according to the invention is used here, an embodiment is particularly advantageous in which one transport carriage of a pair effects a connection between the one pole of a voltage source and the article to be coated, while the other transport carriage effects a connection between the opposite pole of a voltage source and an auxiliary electrode carried inside the article to be coated. In the case precisely of large, hollow articles, electrophoretic dip coating of the inner surfaces becomes ever more difficult, since the inside remains extensively field-free because the article acts as a Faraday cage. In order to counter this, an auxiliary electrode may be introduced into the interior of the article to be coated, to which electrode the necessary voltage is then supplied via one of the two transport carriages. The basic design of the two transport carriages remains the same, wherein the power supply, which is used in the case of the one transport carriage to bring the article itself to deposition potential, is used in the case of the other transport carriage to bring the auxiliary electrode to the counter-potential.

BRIEF DESCRIPTION OF DRAWINGS

Exemplary embodiments of the invention are explained in more detail below with reference to the drawings, in which.

DETAILED DESCRIPTION

Figure 1:
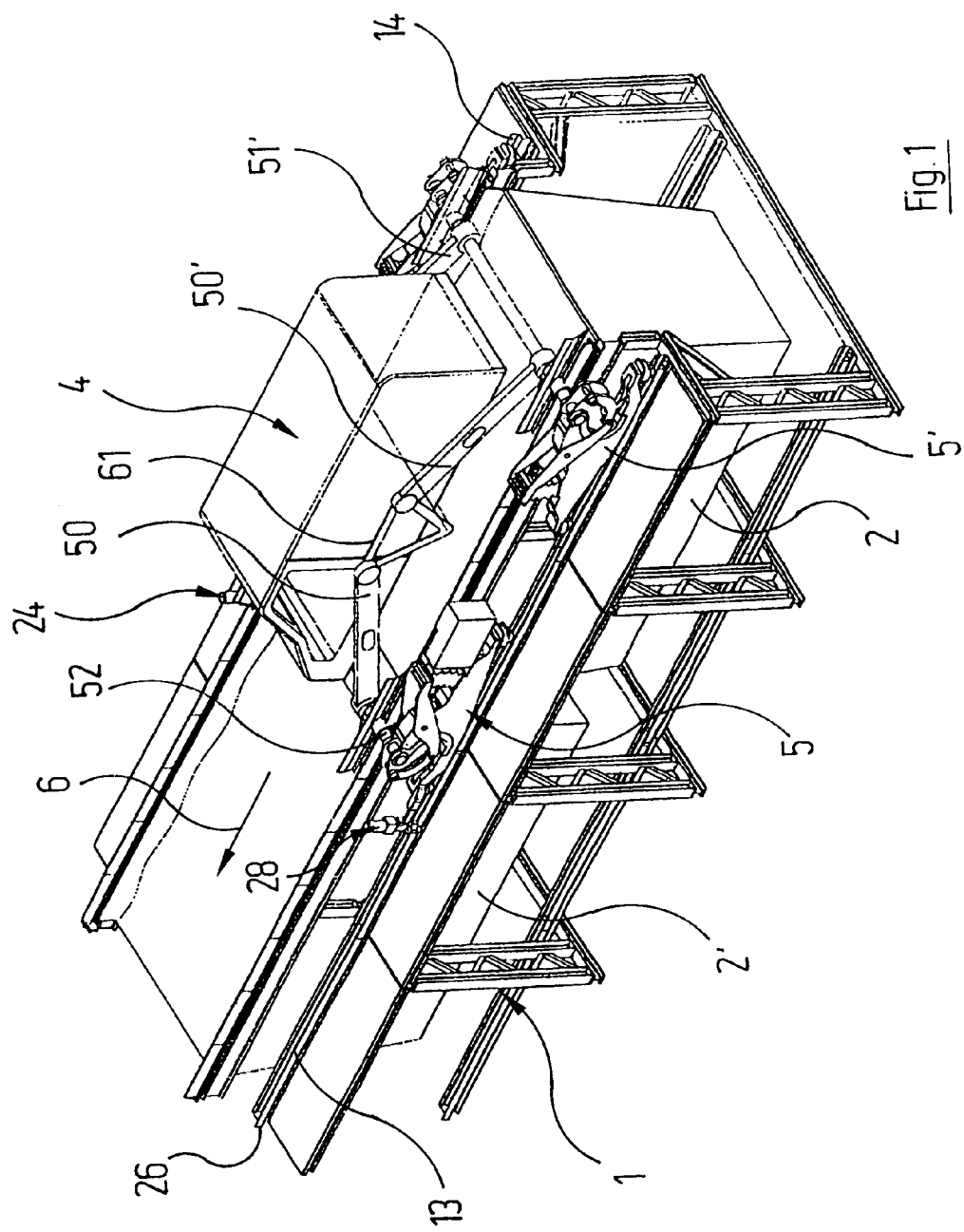
FIG. 1 shows a perspective portion of a dip coating installation for large vehicle bodies.

Reference will be made first of all to FIG. 1. The dip coating installation illustrated here for large vehicle bodies 4, in the case shown those of a van, comprises a steel structure 1 comprising a plurality of vertical uprights and horizontal girders, in which structure there are suspended two bath containers 2, 2'. The bath containers 2, 2' are filled to a certain level with a treatment liquid, for example liquid paint, into which the vehicle bodies 4 are to be dipped. These vehicle bodies 4 are conveyed to this end by means of pairs of transport carriages 5, 5' in the direction of arrow 6 (c.f. FIG. 1), wherein the translational movement of the pairs of transport carriages 5, 5' may take place altogether mutually independently and, in the course of these independent movements, deceleration, acceleration, stops and reversal of movement of the pairs of transport carriages 5, 5' are possible. Overall, however the vehicle bodies 4 are conveyed in the direction of arrow 6 of FIG. 1.

The translational movements of the transport carriage 5, 5' within a pair are coordinated as described below in more detail.

All the transport carriages 5, 5' are, unless otherwise stated, of substantially the same construction. They are therefore described with reference to the left-hand transport carriage 5 in FIG. 2. The structure corresponds to a considerable extent to that which is known from DE 201 05 676 U. Reference is additionally made to this publication to assist in understanding of the transport carriage 5.

Figure 2:
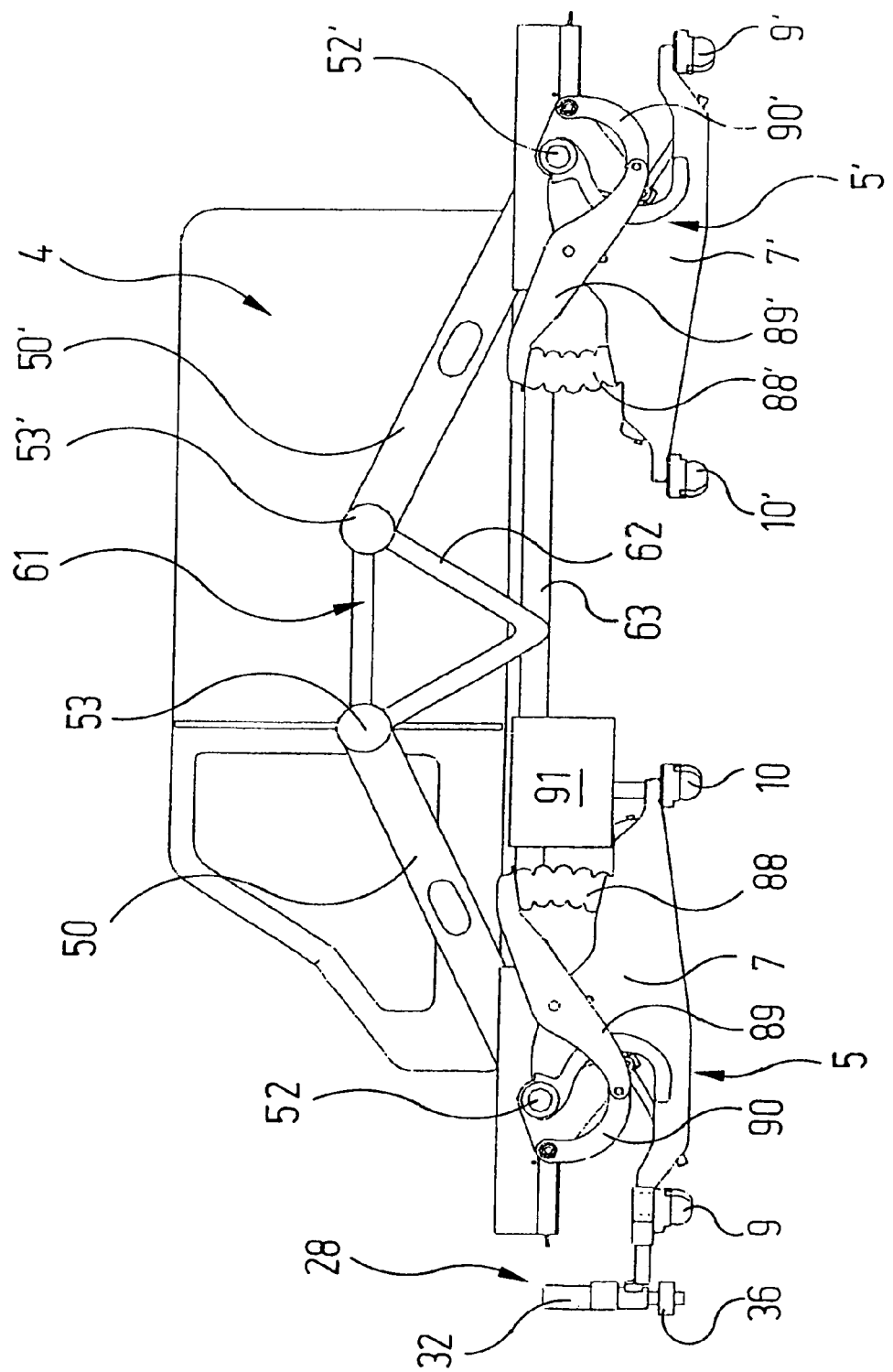
FIG. 2 shows an enlarged-scale side view of a pair of transport carriages, which are used in the dip coating installation of FIG. 1, with a loaded body in the normal conveying position.

The transport carriage 5 has a running gear with two longitudinal beams 7, of which only the front one is visible in FIG. 2 and on the bottom of which there are mounted in each case two wheels 9, 10, which are rotatable about a horizontal axis. In addition, the wheels 9, 10 are each rotatable about a vertical axis by means of a pivoted bolster, not shown in detail, such that the orientation of the wheels 9, 10 relative to the respective longitudinal beams 7 may be altered.

The wheels 9, 10 roll on two parallel running surfaces 13, 14, which are in turn carried by the steel structure 1. Like the steel structure 1, the running surfaces 13, 14 are illustrated only in FIG. 1 and omitted from the subsequent Figures, in order not to clutter them.

One of the running surfaces 13, 14 is provided, in the manner described in DE 201 05 676 U, with a guide rib which the wheels 9, 10 of the transport carriage 5 follow.

The transport carriage 5 has a dipping device, which in each case comprises a swivel arm 50, 51 on either side of the vehicle bodies 4. This may swivel in a vertical plane extending parallel to the conveying direction about a lower pivot pin 52, which is mounted in a longitudinal beam 7. This swivelling motion is brought about by a geared motor, not shown in the drawings.

An axle stub 53 is mounted swivellably at each of the outer ends of the swivel arms 50, 51, which stub 53 may be set in rotation by means of a drive extending through the interior of the hollow swivel arms 50, 51 from a geared motor (again not shown). These axle stubs 53 are connected rigidly at a first point to a supporting structure 61 for the vehicle body 4, which is explained in more detail below.

In the case of the subject matter of above-mentioned DE 201 05 676, the torque which is exerted on the swivel arms of the transport carriage by the weight of the vehicle body and the supporting structure is compensated by counterweights, which are fitted to an extension of these swivel arms projecting beyond the lower pivot pin. In the exemplary embodiment of the invention illustrated in the drawings, these counterweights are replaced by a bellows-type spring 88, which is connected to the swivel arms 50, 51 via a plurality of articulated members 89, 90 in such a way that the bellows-type spring 88 is compressed by the weight of the vehicle body 4 and the supporting structure 61. Details of this weight compensation are not relevant in the present context.

The wheels 9, 10 of the transport carriage 5 are not themselves driven. Instead, forward drive of the transport carriage 5 is effected by means of separate pressure roll drives 28, 29, as described in DE 201 05 676 U and which interact with stationary drive flanges 26, 27 extending parallel to the two running surfaces 13, 14 and oriented vertically (c.f. FIG. 1). The pressure roll drives 28, 29 each comprise an electric drive motor 32, which drives two pressure rolls 36, 37, which are pressed from both sides against the respective associated drive flange 26 or 27. When power is supplied to the drive motors 32, 33, the pressure rolls 36, 37 run on the respective side faces of the drive flanges 26, 27 and move the transport carriage 5 forwards on the running surfaces 13, 14.

The second transport carriage 5' of the pair of transport carriages 5, 5' illustrated in FIGS. 1 and 2 is constructed in the same way as the transport carriage 5, except for the differences outlined below. Elements of the transport carriage 5' are therefore identified with the same reference numerals as the transport carriage 5, but with an added'. Where it is identical, the second transport carriage 5' will not be described.

The transport carriage 5' is positioned in the opposite direction to the transport carriage 5 on the running surfaces 13, 14, such that the outer ends of the swivel arms 50, 51, 50', 51' point towards one another. The axle stub 53 mounted in each case at the outer end of the swivel arm 50' of the transport carriage 5' and itself forming a pivot pin is attached rigidly to a second point of the supporting structure 61. The supporting structure 61, to which the vehicle body 4 is detachably fastened, to this end comprises on both sides of the vehicle body 4 in each case a triangular holding frame 62, which is connected rigidly at a bottom angle to a supporting frame 63, on which the vehicle body 4 rests and which extends horizontally in the normal conveying position illustrated in FIGS. 1 and 2. The axle stubs 53, 53' of the two transport carriages 5, 5' are attached in the area of the upper angles of the holding frame 62.

While, as described above, the pivot pins 52, 53 of the first transport carriage 5 are driven and this first transport carriage 5 also has its own translational drive 28, such drives are not provided for the pivot pins 52', 53' or the linear drive of the second transport carriage 5'. If identical transport carriages 5, 5' are used, the drives of the transport carriage 5' are uncoupled, such that the pivot pins 52', 53' of the transport carriage 5' rotate freely in their bearings and the transport carriage 5' may be freely displaced.

Accordingly, only the first supporting carriage 5 comprises its own control means, which are carried in a control box 91.

The above-described dip coating installation operates as follows:

In the area outside the dipping tank 2, 2', the two transport carriages 5, 5' are moved translationally and in synchronized manner within a pair. This proceeds solely via the translational drive 28 of the transport carriage 5. The transport carriage 5 pushes or pulls the transport carriage 5' via the connection existing between them, which is formed by the swivel arms 50, 51 of the supporting structure 61 and the swivel arms 50', 51'. In this respect, the angular position of the swivel arms 50, 51 relative to the longitudinal beams 7 of the first supporting carriage 5 is fixed by the corresponding drives, just as is the angular position of the supporting structure 61 relative to the swivel arms 50, 51 of the first supporting carriage 5. This results, without additional fixing, in positioning of all the movable components of the second transport carriage 5'.

Figure 5:
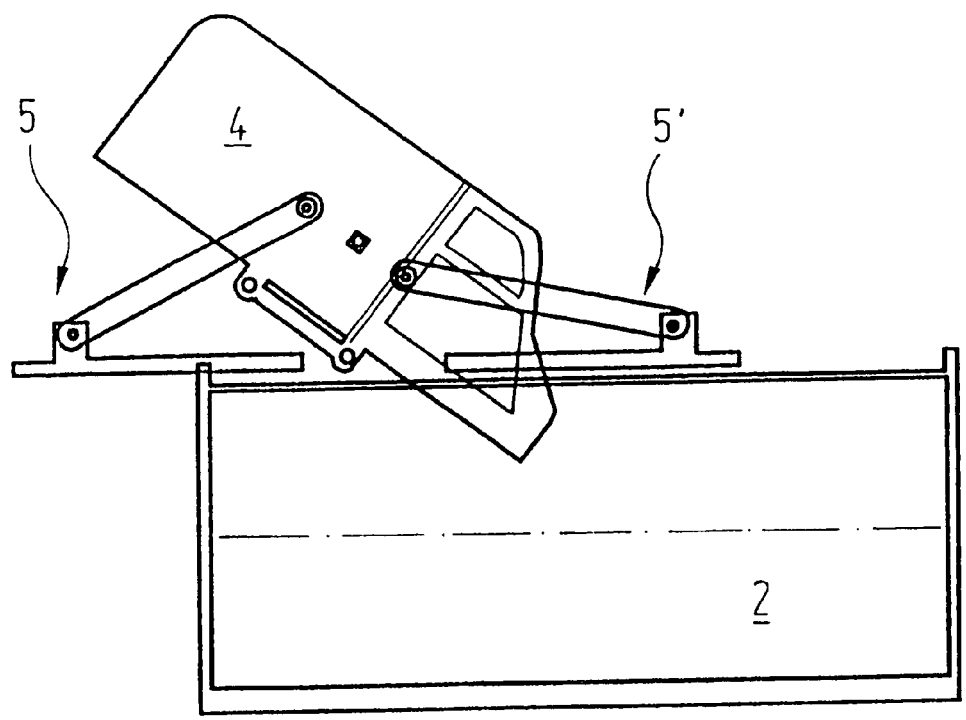
FIGS. 5 to 10 are sequential images of first motion kinematics, which may be effected in the installation of FIGS. 1 to 4 during dipping and raising of the vehicle body.
Figure 6:
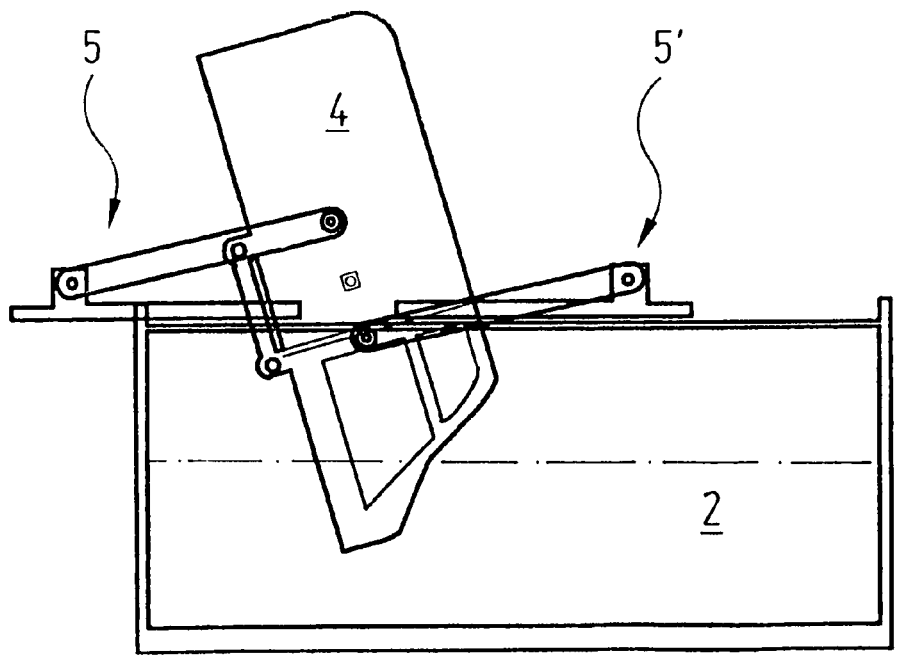
Figure 7:
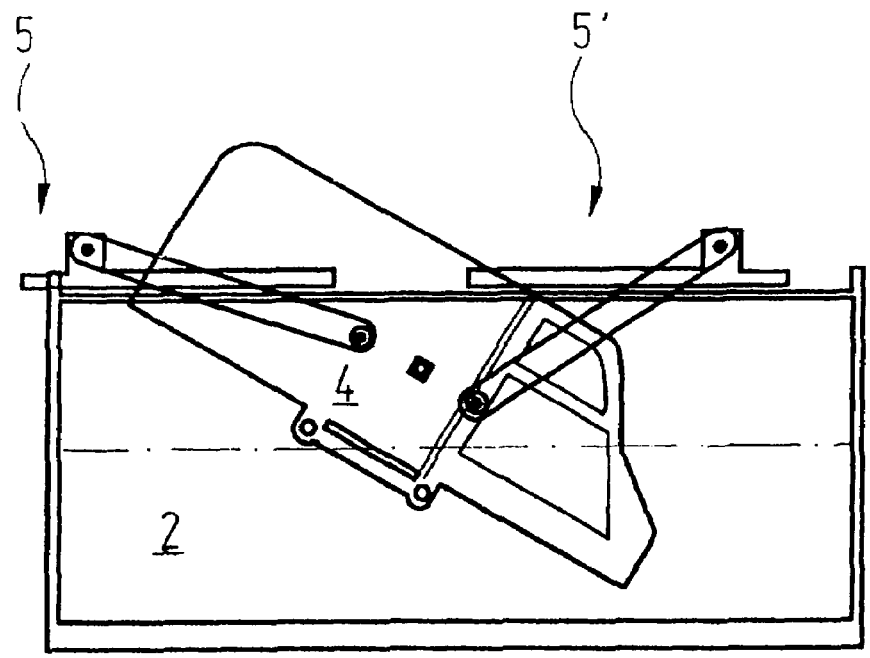
Figure 8:
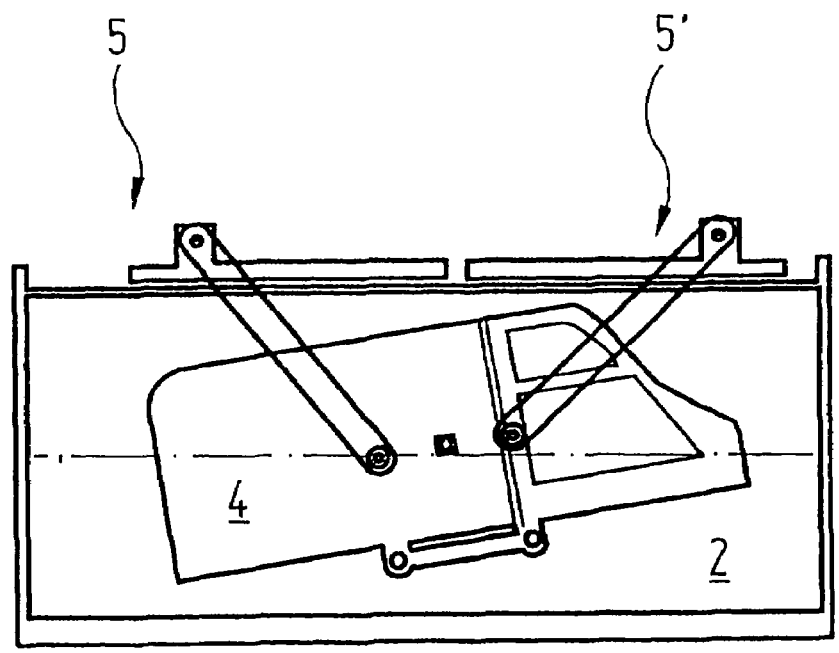
Figure 9:
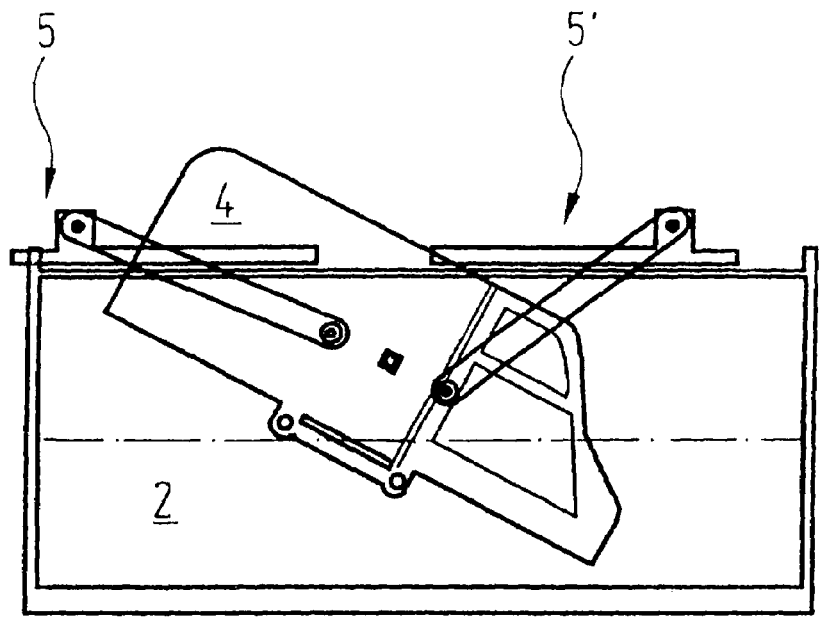
Figure 10:
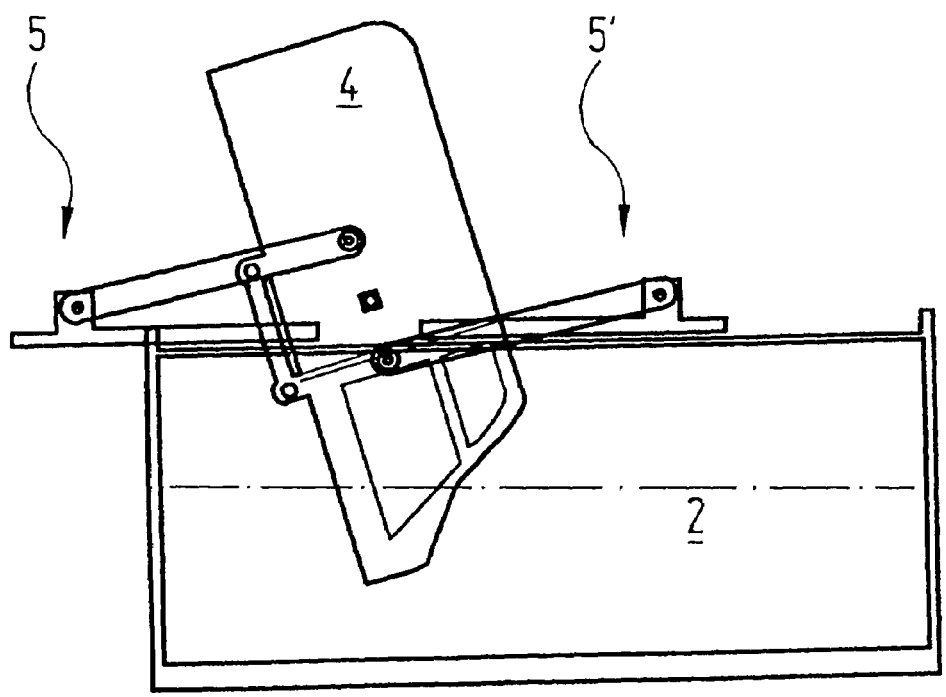
Figure 11:
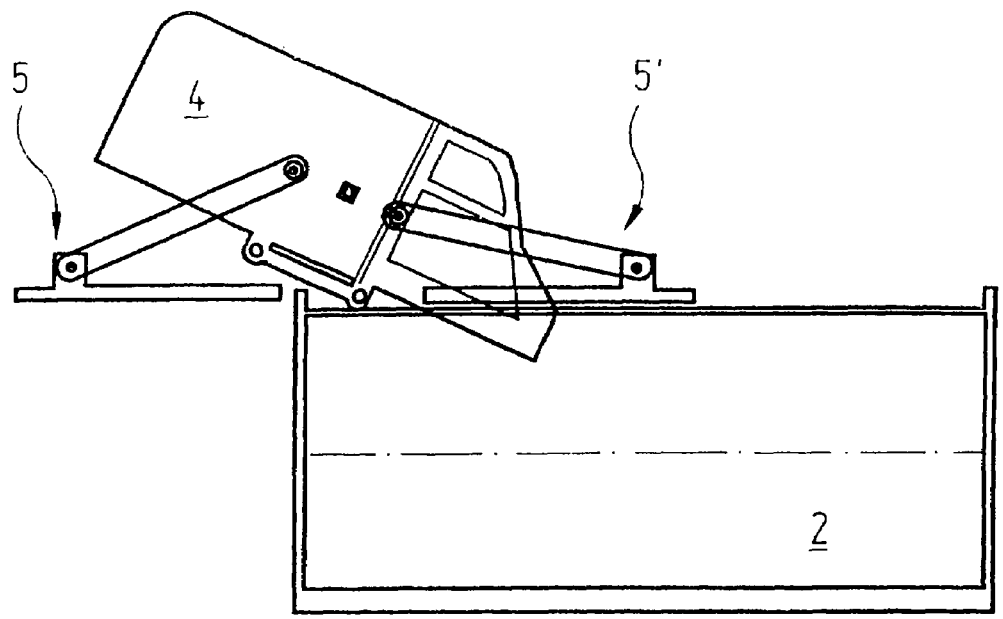
FIGS. 11 to 17 are sequential images of second motion kinematics, which may be effected in the installation of FIGS. 1 to 4 during dipping and raising of the vehicle body.
Figure 12:
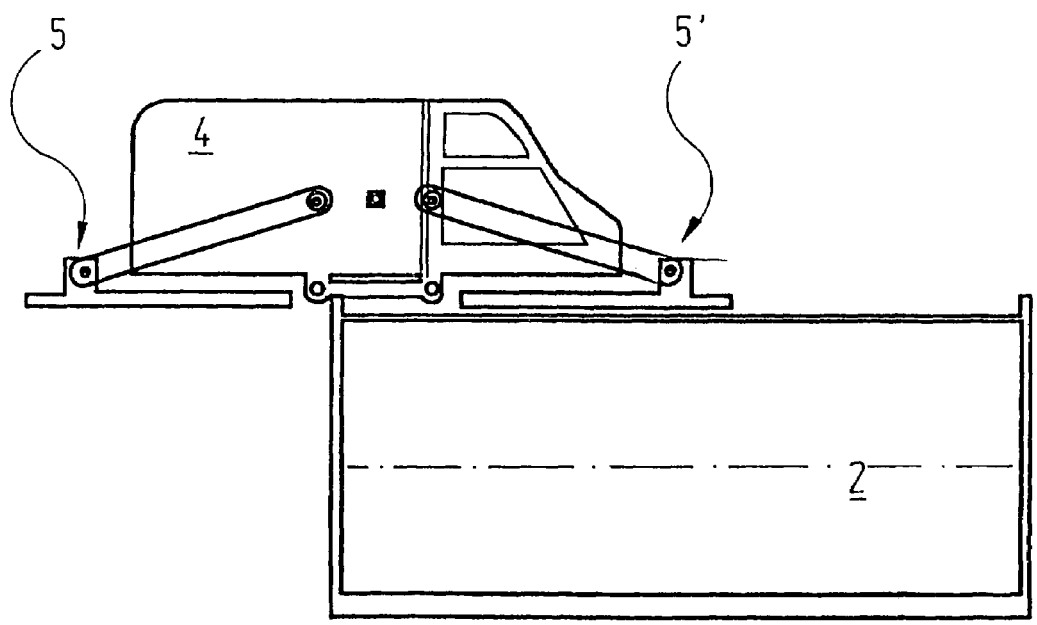

If the vehicle body 4 has then to be dipped into one of the dipping tanks 2, 2', virtually any desired dipping movement kinematics may be achieved by supplying power to the drive motors with which the pivot pins 52, 53 of the first supporting carriage 5 are rotated. An example of such kinematics is revealed in FIGS. 5 to 12. Here, the vehicle body 4 is swivelled from the conveying position initially in such a manner that its front part is dipped down into the treatment liquid (FIGS. 5 and 6) and then re-oriented substantially horizontally within the treatment liquid (FIGS. 7 and 8). The subsequent removal movement takes place in reverse. This means that the vehicle body is raised by its rear end and removed from the treatment liquid by that end first (FIGS. 9 and 10), its front part then being swivelled out of the treatment liquid (FIGS. 11 and 12). Once the vehicle body 4 has then reached its normal conveying position illustrated in FIG. 12, in which position the supporting platform 63 is oriented substantially horizontally, the two transport carriages 5, 5' are moved further translationally.

Figure 13:
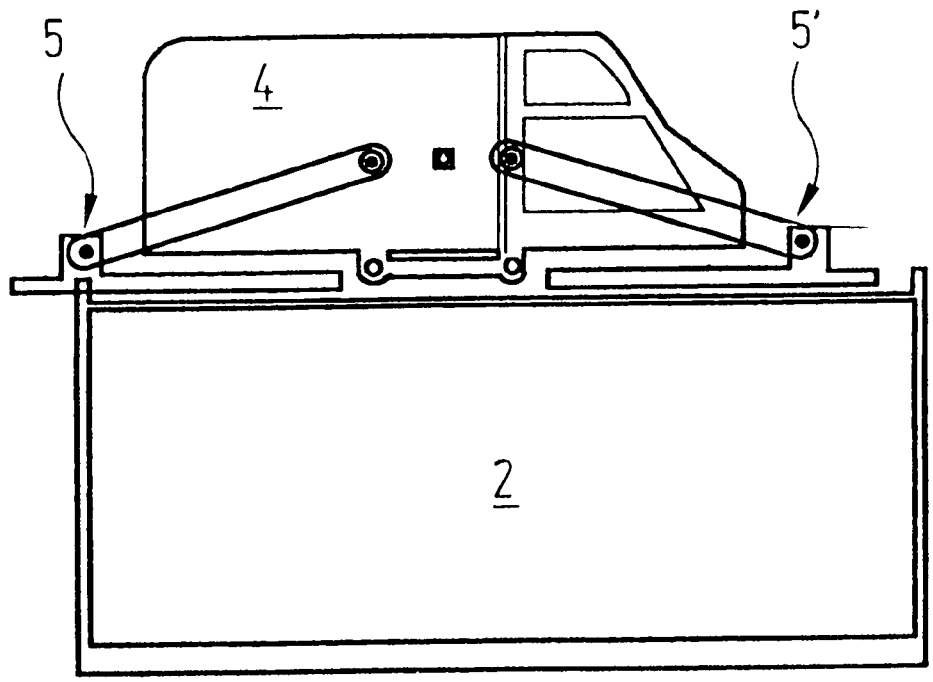
Figure 14:
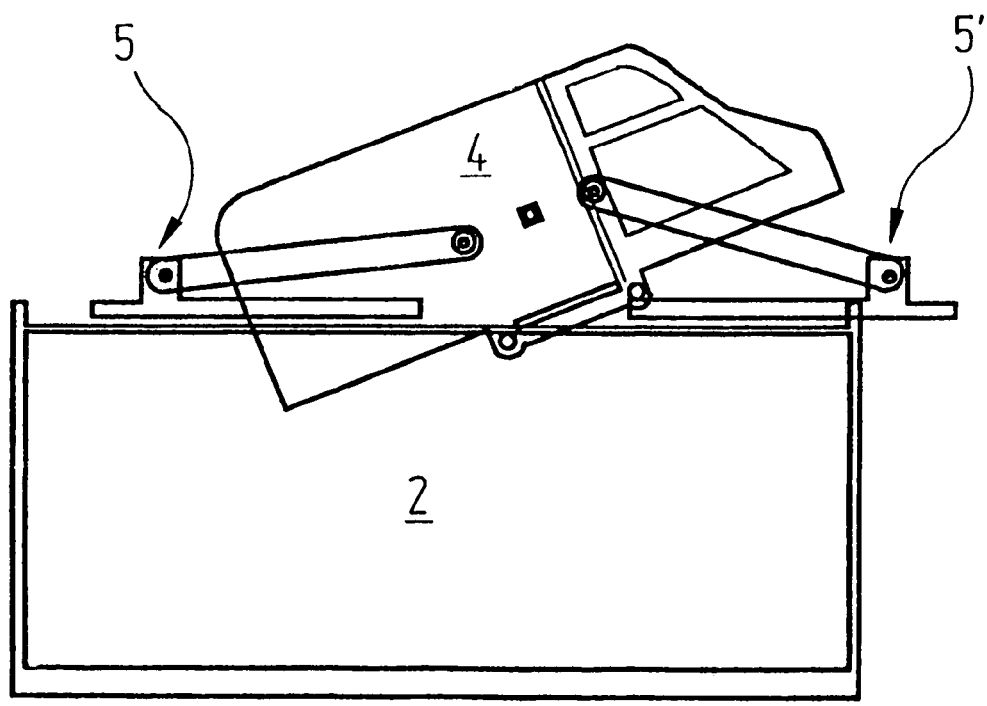
Figure 15:
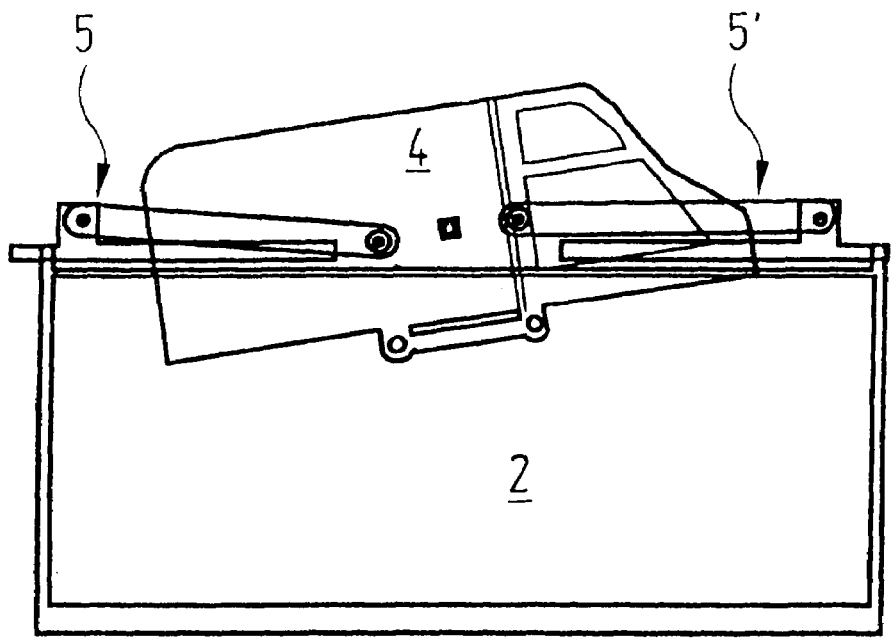
Figure 16:
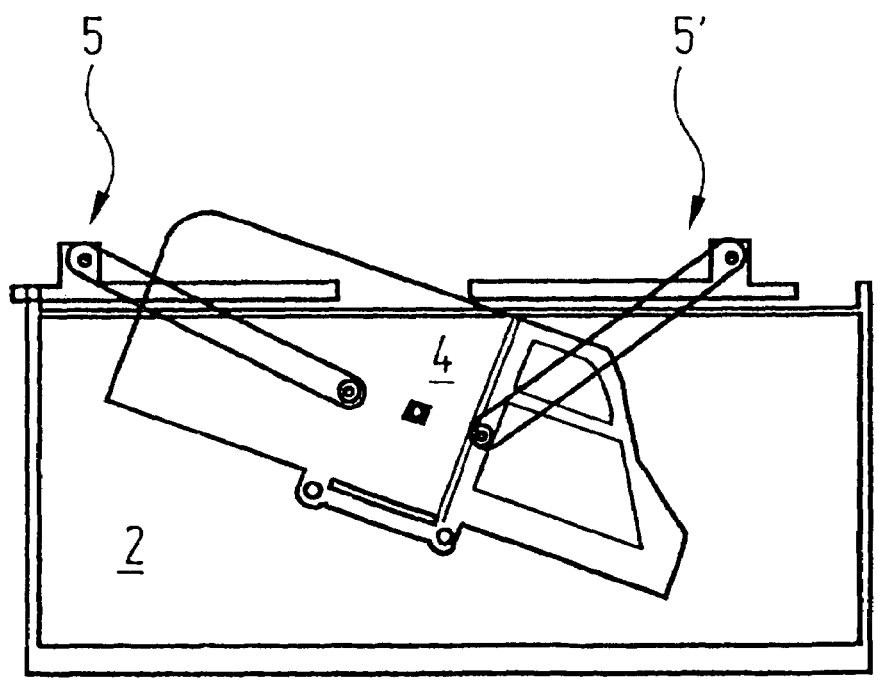
Figure 17:
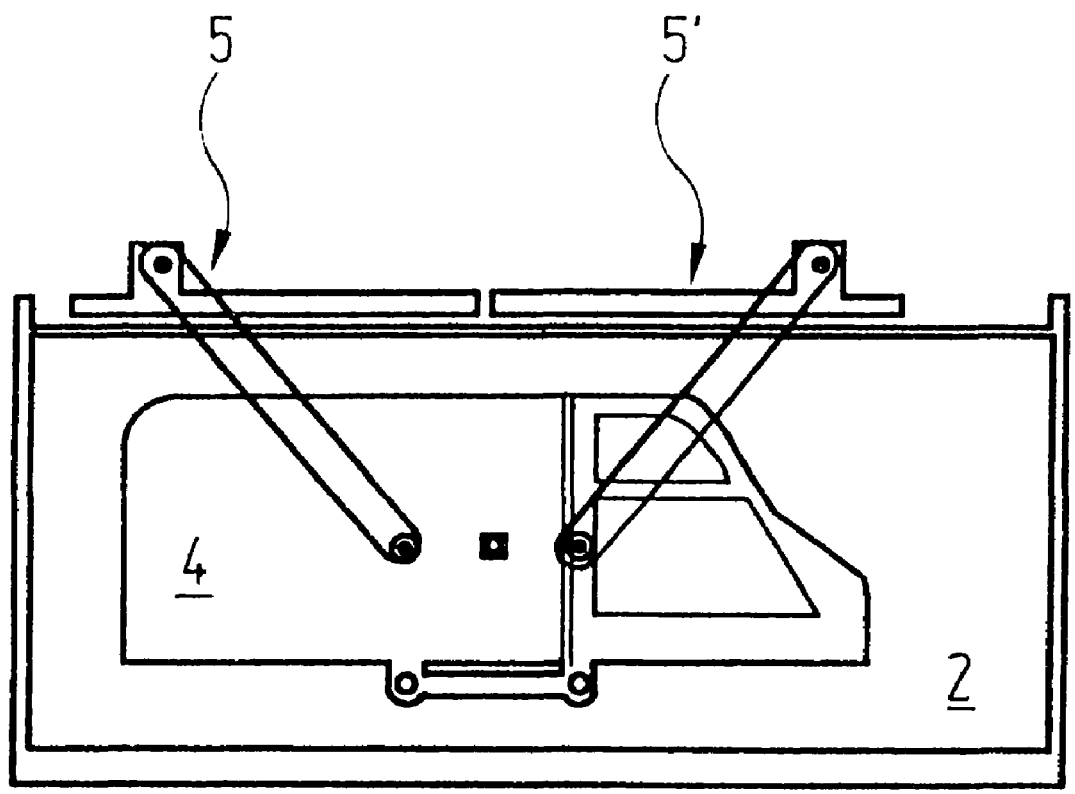

A second option for effecting a dipping operation with the two transport carriages 5, 5' is shown in FIGS. 13 to 17. Here, the vehicle body 4 firstly travels over the dipping bath 2 in the normal conveying position with a horizontally oriented supporting platform 63 (FIG. 13). Then, the front part is raised somewhat and the vehicle body 4 is dipped partially into the treatment liquid at an oblique angle, with its rear end first, while the supporting carriages 5, 5' are simultaneously moved backwards (FIGS. 14 and 15). Then, the swivel direction is reversed: now the front part is dipped downwards at a sharper angle than the rear end (FIG. 16), this being followed again by a sharper dipping movement of the rear end, until, as shown in FIG. 17, the vehicle body 4 is immersed completely in the treatment liquid on a substantially horizontal supporting platform. The removal movement then proceeds backwards in reverse sequence, such that there is no need for a description thereof. Once the vehicle body 4 is back in its normal conveying position, the pair of transport carriages 5, 5' may travel on in a horizontal direction.

It goes without saying that, if controlled appropriately, an infinite number of movement sequences may be achieved, which may be optimally conformed to the respective conditions.

A study of FIGS. 5 to 17 shows clearly that the distance between the two transport carriages 5, 5' changes during the dipping movement. This relative displacement of the transport carriage 5' not driven translationally relative to the translationally driven transport carriage 5 takes place in principle without any special activity. However, under unfavorable circumstances and geometric conditions, self-locking and/or undefined conditions may arise. In order to prevent this, in the exemplary embodiment of the transport carriage pair illustrated in FIG. 3 an additional drive 40 is provided, with which the spacing between the two transport carriages 5, 5' may be varied. This drive 40 comprises a threaded spindle 41, which is mounted rotatably but axially immovably on the left-hand transport carriage 5 in FIG. 3 and may be set in rotation thereon by a motor 42. The threaded spindle 41 extends parallel to the conveying direction as far as the right-hand transport carriage 5' in FIG. 3, which latter is not provided with independent translational drive, and there passes through a threaded nut 53 connected rigidly to this transport carriage 5'. The arrangement is such that, by rotating the threaded spindle 40, the right-hand transport carriage 5' in FIG. 3 may be moved closer to transport carriage 5 or further away therefrom. The drive 40 has of course to be actuated in a manner compatible with the kinematics with which the swivel arms 50, 51 or 50', 51' are moved. In this way, any self-locking which may have occurred or any undefined feature in the movement sequences of the swivel arms 50, 51 or 50', 51' of the two transport carriage 5, 5' may be overcome.

Figure 4:
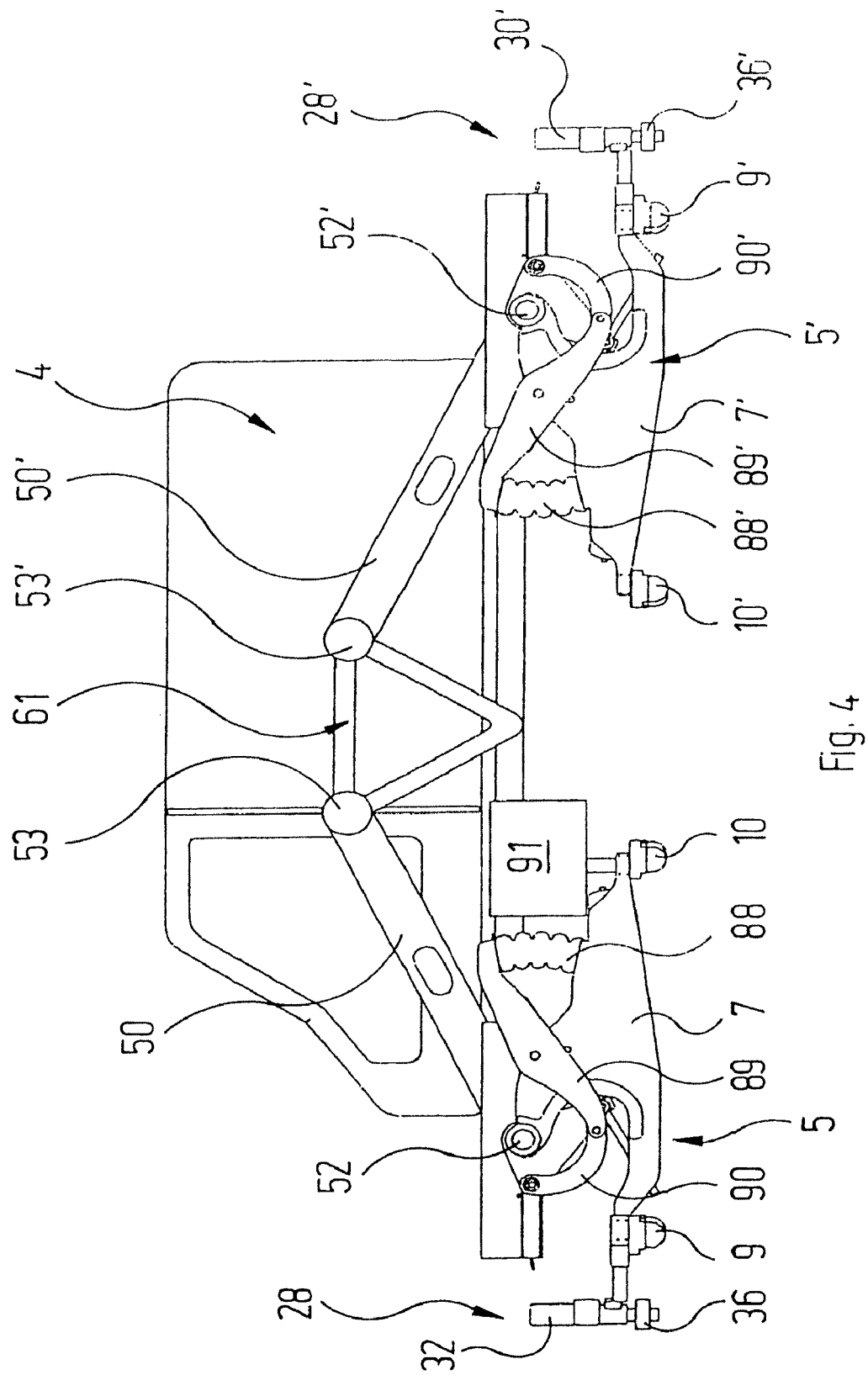
FIG. 4 is a view, similar to FIGS. 2 and 3, in which the transport carriages have undergone further modification.

Instead of the additional drive 40 acting between the two transport carriages 5, 5', it is also possible, for the same purpose, to provide the second transport carriage 5' with its own translational drive 28', as illustrated in FIG. 4. This translational drive 28', which may be actuated in a corresponding manner, may prevent self-locking of the movement sequences.

Figure 3:
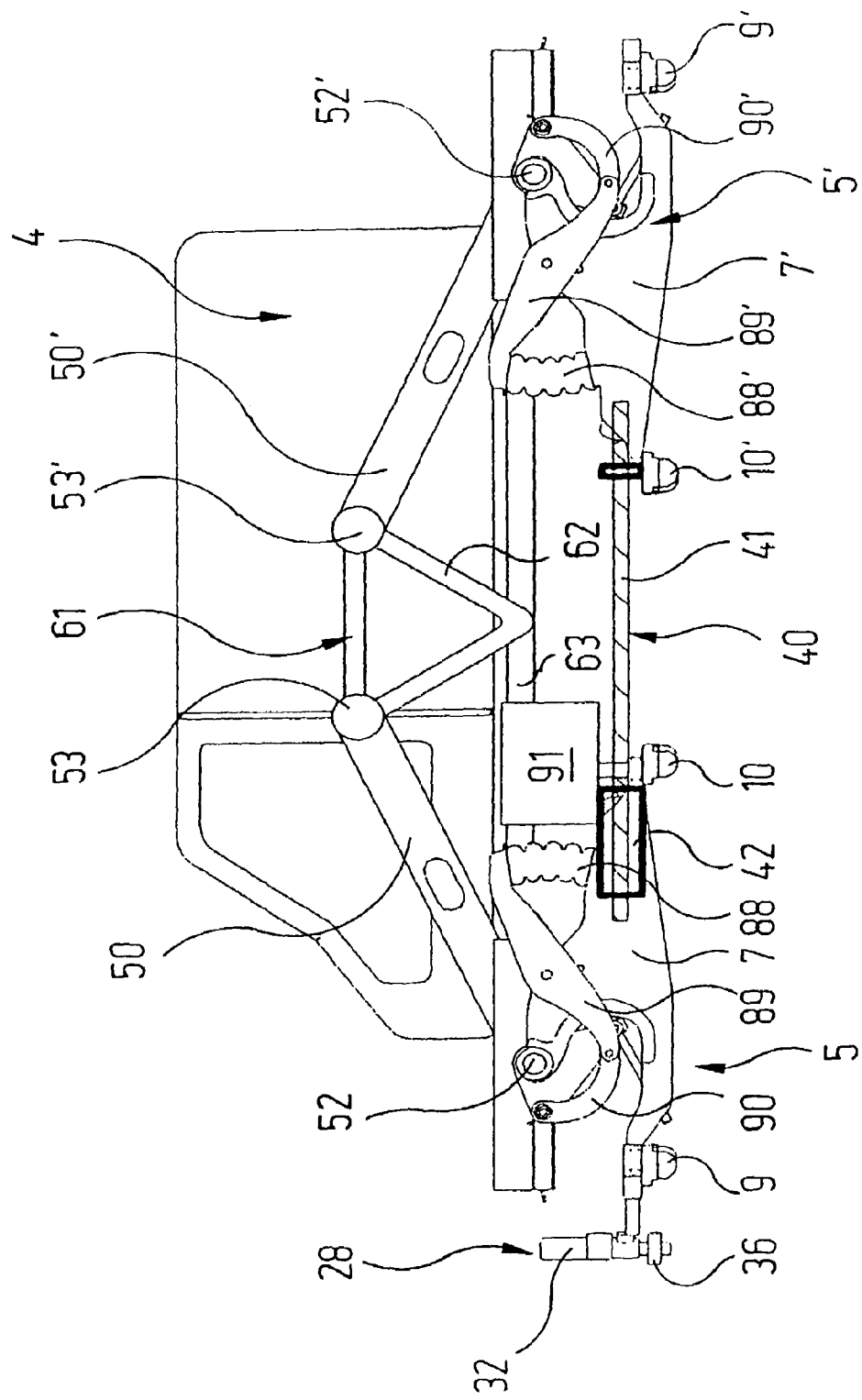
FIG. 3 is a view, similar to FIG. 2, in which the transport carriages have been somewhat modified, however.

It goes without saying that it is not essential for all the drives to be provided on the same transport carriage 5, as is the case in the exemplary embodiments of FIGS. 2 and 3. In general, the following conditions apply:

The overall system consisting of the two transport carriages 5, 5' and the supporting structure 61 connecting them has the following degrees of freedom: the translational movement of the first transport carriage 5, the translational movement of the second transport carriage 5', swivelling of the swivel arms 50, 51 of the first transport carriage 5 about the first pivot pin 52, swivelling of the swivel arms 50', 51' of the second transport carriage 5' about the first pivot pin 52' thereof, swivelling of the supporting structure 61 about the upper pivot pin 53 of the first transport carriage 5 and swivelling of the supporting structure 61 about the upper pivot pin 53' of the second transport carriage 5'. Of this total of six degrees of freedom, a total of three degrees of freedom must be driven in a controlled manner; in the other three degrees of freedom, the position of the various components then establishes itself automatically. If need be, to overcome self-locking and other undefined features under unfavorable conditions it is favorable, as mentioned above, to provide a drive for a fourth degree of freedom.

How the drives for the various degrees of freedom are distributed between the two transport carriages 5, 5' is fundamentally unimportant and may be freely determined in accordance with installation-specific circumstances. For example, it would be possible, instead of driving the upper pivot pin 53 of the first transport carriage 5, to drive the upper pivot pin 53' of the second transport carriage 5', without otherwise changing the drive conditions.

If the transport carriages 5, 5' are used to guide the vehicle body 4 through a cataphoretic dipping bath, the connection between a transport carriage 5 and the vehicle body 4 may be used to bring the vehicle body 4 to cathode potential, while the second transport carriage 5' supplies voltage to an auxiliary anode which is carried in the interior of the vehicle body 4. This improves the deposition of coating pigment particles on the inner surfaces of the vehicle body 4, which would otherwise be located in the field-less area.

The invention claimed is:

1. An installation for treating articles comprising:
   a) at least one treatment zone into which the articles are introduced; and
   b) a conveying means, with which the articles may be conveyed through the installation in a continuous or intermittent translational movement and which comprises:
      at least one pair of transport carriages, which in turn comprises:
         a first transport carriage comprising:
            a running gear; and
            at least one swivel arm, which is connected with the running gear to be swivellable about a first pivot pin and with which a first point of a supporting structure for the article to be treated is connected to be swivellable about a second pivot pin; and
         a second transport carriage, which likewise comprises:
            a running gear; and
            at least one swivel arm, which is connected with the running gear to be swivellable about a first pivot pin and with which a second point of the supporting structure is connected to be swivellable about a second pivot pin;
   wherein
   c) a means for positioning the at least one pair of transport carriages comprising the following six degrees of freedom of motion:
      a translational movement of the first transport carriage;
      a translational movement of the second transport carriage;
      a swivelling of the at least one swivel arm of the first transport carriage about the first pivot pin thereof;
      a swivelling of the at least one swivel arm of the second transport carriage about the first pivot axis thereof;
      a swivelling of the supporting structure about the second pivot pin of the first transport carriage; and
      a swiveling of the supporting structure about the second pivot pin of the second transport carriage; and,
   d) drives are provided for at least three of the six degrees of freedom of motion, and at least one of the drives is a translational drive.

2. The installation of claim 1 wherein drives are provided for four degrees of freedom of motion, and at least one of the drives is actuated by a control means which is compatible with the drives of the other degrees of freedom of motion.

3. The installation of claim 2 wherein one of the first or second transport carriages of the at least one pair of transport carriages comprises a drive which varies a spacing between the first and second transport carriages of the at least one pair of transport carriages.

4. The installation of claim 3 wherein the drive provided which varies the spacing is a spindle drive.

5. The installation of claim 1 wherein both the first and second transport carriages of the at least one pair of transport carriages comprise the translational drive.

6. The installation of claim 1 wherein all the drives for all the degrees of freedom of motion are arranged on one of the transport carriages of the at least one pair of transport carriages.

7. The installation of claim 1 wherein the drives for the degrees of freedom of motion are distributed between the first and second transport carriages of the at least one pair of transport carriages.

8. The installation of claim 1 wherein the treatment zone comprises a dipping tank for electrophoretic dip coating, wherein one of the first or second transport carriages of the at least one pair of transport carriages effects a connection between a pole of a voltage source and the article to be coated, while the other of the first or second transport carriages of the at least one pair of transport carriages effects a connection between an opposite pole of the voltage source and an auxiliary electrode carried inside the article to be coated.

* * * * *

UNITED STATES PATENT AND TRADEMARK OFFICE
CERTIFICATE OF CORRECTION

PATENT NO. : 7,393,444 B2  Page 1 of 1
APPLICATION NO. : 10/708310
DATED : July 1, 2008
INVENTOR(S) : Franz Ehrenleitner It is certified that error appears in the above-identified patent and that said Letters Patent is hereby corrected as shown below:

Title Page, Item (73) Assignee    Typographical error in spelling of Assignee name: "Analgenbau" Assignee name should read: --Eisenmann Anlagenbau GmbH & Co. KG--

Signed and Sealed this

Second Day of September, 2008

JON W. DUDAS
*Director of the United States Patent and Trademark Office*